Patented Oct. 6, 1942

2,298,159

UNITED STATES PATENT OFFICE 2,298,159

PREPARATION OF FRESH MEATS

Karl G. Plitt, Sr., Karl G. Plitt, Jr., and Eugene A. Plitt, St. Louis, Mo.

No Drawing. Application December 13, 1939, Serial No. 308,948

3 Claims. (Cl. 99—107)

This invention relates to improvements in preparation of fresh meats, and particularly pertains to the treatment of boneless fresh meat to render it more uniform in texture and quality, and to convert it to a more desirable physical form for dispensing to the trade.

A major object of the invention is attained in an improved process for homogenizing fresh boneless meat; the term "homogenizing" being herein employed as relating to a method or process for rendering more uniform, the internal texture, tenderness, as well as the weight and size of individual serving units to be dispensed to the consuming trade.

Akin to the foregoing object is the attainment of an improved result, as reflected in a meat or meat product including beef, mutton, pork, lamb, veal, fish or fowl, and particularly beef tenders, sweetbreads, brains, etc., in which product the meat mass is of a higher degree of tenderness, and is more nearly uniform in tenderness throughout the mass, whereby there is required a more uniform cooking time, less preliminary preparation by the consumer and an improvement in appearance, taste and quality.

Generally expressed, the invention importantly attains as an objective, a marked increase in uniformity in weight and size of individual slices of meat for dispensing to the trade.

Yet another important object of the invention is attained in an improved method of releasing at least a substantial part of the meat juices heretofore confined in the meat cells, by treatment of the meat as will be described, prior to dispensing to the trade. The attainment of this object is reflected in an increased "juiciness," advantage of which is taken to produce an improved dispensing unit for the trade, in which unit the meat is cross-piled in thin slices or laminae, which are caused to adhere, even through cooking, by the adhesive effect of the liberated meat juices.

The foregoing and numerous other objects and advantages of the invention will more clearly appear from the following description of a preferred exemplary practice of the invention as successfully utilized in the homogenizing and tenderizing of fresh meats.

Referring now in greater detail to the nature of the several steps involved and the preferred order of their practice in a complete treatment of fresh meats, it may be noted that the first step involves the selection of either a single piece of the desired fresh meat of selected size, which mass of meat is preferably subjected to a first step of removing any bones, extremely fibrous portions, tendons and the like, so as to condition the meat in such manner that, were it subjected to no further treatment, it could be sliced readily either by slicing knives or automatic slicing equipment. At this point the meat is in the stage ordinarily referred to as boneless meat.

Incident to the next step of the process it is preferred to employ a mold of a type to confine the meat, and permit it to be subjected to a substantial external pressure, as will hereinafter appear. For this purpose it is preferred to employ a square mold, being one characterized for example, by two telescopically related mold halves, preferably formed of cast aluminum by reason of the good conductivity of this metal. By further preference the shape of the mold is rectangular in either vertical or horizontal section. It is however distinctly within our contemplation that a mold of any suitable or desired shape may be employed, for example, one in which the parts are so shaped that when the meats are pressed therein, they are conformed to simulate porterhouse steaks, T-bone steaks or other usual natural shapes or cuts of meat.

In lieu of utilizing for the treatment a single slab or mass of meat of a size appropriate to occupy the interior of the mold, it is distinctly within the purview of the invention to utilize any plurality of odd-sized pieces of boneless meat which may consist of small or large, regular or irregular shaped pieces of meat which may be of the same or of different varieties.

With the meat now disposed in and substantially occupying completely, the mold interior, the mold parts are closed thereover and the mold subjected to a relatively high physical pressure. This may be imparted to the mold either in a hydraulic or a mechanical press, but it is preferred that the extent of the applied pressure be definitely determinable and known to the operator. It may be stated in connection with the current example, that the physical pressure to which the parts of the mold are subjected with the meat therein, should be at least as high as 150 pounds per square inch. It is a preference, however, and has been found conducive to uniformity of the finished product, to utilize an external pressure on the mold of the order of 200 to 250 pounds per square inch.

This pressure is applied for some little time prior to the ensuing step of hard freezing. Although the present explanation is to be regarded primarily as in the nature of a discovery, and the theory of the benefits obtained is somewhat hypothetical, it is expressed as a present belief that the high physical pressure to which the meat is subjected, serves to rupture at least a substantial number of the internal cells of the meat, thus releasing from their normal internal confinement, the meat juices, or a considerable proportion of same. Since the halves of the mold are imperforate, the meat juices released from the cells, particularly those that find their way to the surface of the meat, will be retained throughout the period of application of physical pressure. It will readily appear that the described step of cell rupture may be practiced with marked benefits without being followed by the freezing step, later described, and will serve materially to tenderize, i. e. to render more tender, the more fibrous and resistant parts of the beef or other muscular meats. This will also apply of course to other meats in the nature of glandular or non-muscular meats, although the degree of improvement is more marked in connection with meats of the former type.

As the next preferred step, the meat while still confined in the mold and by further preference, still retained under the described physical pressure, is subjected to a quick or hard freezing temperature. The exact temperature to be selected, is of course a function of the length of time through which the freezing step is permitted to endure, but it has been found practical and expedient with usual hard freezing equipment, to subject the mold and contents while under pressure, to a temperature of the order of plus 15° F. for a period of between forty and fifty hours time, conveniently a forty-eight hour period. The effect of the freezing process is thought to be at least two fold, namely, the cell walls internally of the meat, being highly stressed by reason of the high physical pressure to which the meat is subjected, the freezing will serve still further to effect a cell-rupturing result. Also, and importantly in the present process, the freezing acts definitely to confine the juices of the meat and so retain them in situ throughout the meat mass. Were the juices after their release, permitted to flow to the lower parts of the mass there would result an unduly dry condition in the drained parts of the meat, which is prevented by freezing it at a reasonably low temperature. It may be noted that the subjection of the mold and contents, say for forty-eight hours, to a temperature of 15° F. for example, serves to freeze the mass of meat to solid condition throughout. The quick-freezing of the meat offers an advantage in retention of the meat juices released by the pressure, in that the outside portions of the meat mass will become solidified first, thus forming a "shell" or enclosure which is reasonably fluid-tight and will serve to retain the juices later released by prolonged pressure, until finally the whole meat mass is frozen. This effect is particularly noticeable in case the meat is subjected to an initial low temperature, say 0° to 10° F. for a short time, then cooled for a more protracted period at a somewhat higher temperature for economy.

The ensuing step in the process as preferably practiced, consists in a localized quick surface thawing of the meat to enable its easy and quick removal from the mold, the physical pressure being of course released therefrom. This quick surface thaw is effected by submersing the mold in hot water for a few minutes. As soon as the meat is enabled to be removed from the mold, a gradual or protracted thawing process is effected by permitting the meat gradually to restore itself to a temperature, say of the order of 34° F., or if desired, up to ambient temperature. It is preferred that about six hours time be allotted for the thawing process, so as to insure that none of the interior portions of the meat mass remains in solid condition, which but for complete thawing might result, incident to machine slicing, in a tearing effect rather than a complete and clean cutting action.

The mass of meat, whether a single piece or whether a molded or formed loaf composed of several original pieces, is now ready for slicing. This operation is preferably effected in an automatic slicing machine, either by a multiple knife or saw, or single knife or saw arrangement, or if desired, may of course be carried out by knife slicing and solely manual methods. The use of an automatic slicing machine is mentioned as preferably solely because of uniformity and economy in the slicing operation. The size of the slices is of course a matter of choice, and may range from the usual No. 5 slice to any higher thickness desired, or otherwise expressed, may range from slices figuring 32 thereof to the pound, ranging up through a one pound size, the latter sometimes being desirable in steaks. Since however the improved product attains its greatest degree of success and meets its best demand from the trade when of laminated units, it is preferred that the slices be reasonably thin, in most cases of the order of a No. 5 slice or slightly greater in thickness.

It is invariably the case that meats of all kinds, being natural products, are not uniform throughout their mass, in texture and consistency; for example, a given steak as ordinarily produced and sold will consist in part, even after boning, of a relatively more fibrous region even approaching or reaching the condition described as "gristly," while other regions or portions of the same piece of meat will be relatively satisfactory, and still others although tender, be of the distinctive muscular or "stringy" makeup. In recognition of this fact, and as a result of protracted experiments to produce a more uniform meat product, the present improvements preferably include the step, after the treated meat has been frozen and sliced, of superposing the relatively thin slices, then subjecting the stacked slices to a moderate physical pressure. Partly by reason of the now available natural juices of the meat and a certain natural adhesion, but more especially in connection with the present process which prior to the present step has resulted in a distinct exudation of the meat juices, such juices in and between the stacked slices cause a noticeable adhesion of each slice to the adjacent one. Thus the slices may be stacked and moderately compressed in multiple to attain, for example, half pound units of a given meat. Then if desired, each such unit may be readily divided into units of half the noted size, or easily doubled to attain a laminated unit up to, say, a one-pound size or even larger.

It is an important desideratum of the present improvements that, in stacking the slices, each be disposed with its grain at a substantial angle (preferably but not necessarily at a right angle) to the adjacent slices. The laminated unit composed of two or more slices of meat, may thus be described as cross-piled. It results from this practice of cross-piling, that since no two slices or pieces of meat are identical; the tender portions of the adjacent slices as well as the relatively tougher portions, will be staggered or in zig-zag relation throughout the mass of the laminated unit as sold. It is a preference, also, that the unit be kept by the dealer and dispensed in lightly frozen condition, say within the temperature range of 25° F. to 30° F. There will thus be no extensive depth of the relatively more difficultly edible portions, and no large zones of fat in any one of the laminated units as sold, from which it results that the unit of slices as dispensed to the trade, will present a markedly higher uniformity of texture than characterizes a corresponding weight of a single piece of the same variety of meat. . The practice of constituting the product as dispensed from a number of thin layers, slices or laminae, thus coacts with the cell-rupturing treatment heretofore described, in increasing the effective tenderness and homogeneity of the whole mass of the unit of meat.

The method has been heretofore described by making particular reference to meats of muscular or truly fleshy origin; the present method has however been found to be of particular value in dispensing certain types of the low fiber, high protein meats of glandular or solely organic origin. Meats of the type now particularly referred to include sweetbreads, brains, and many other meats of the same general consistency.

In the treatment of these low fiber, high protein meats exemplified by sweetbreads, the meat is first soaked in or extracted by a saline solution for a substantial period, preferably as long as eight hours, prior to any of the ensuing steps of treatment. Since static soaking may be regarded as a form of extraction, this treatment may be so designated irrespective of the actual mode of treatment by the saline solution. After the low-fiber meat has been soaked or extracted some eight hours or longer, it is carefully and thoroughly washed to remove the extracted products and solution, and the sweetbreads for example, are put into the mold and subjected to the same pressure-temperature treatment as above outlined. This is followed by release of the frozen meat mass from the mold, slow thawing as heretofore described, following which the molded meat unit may be sliced, and the slices cross-piled into units of desired weight or size for dispensing to the trade. The process as applied to meat of low fiber high protein type, results in a highly uniform product; one which is homogenous in texture and the slices of which when cross-piled, lend themselves to uniformity of servings, uniformity of texture and of flavor.

It will have appeared from the foregoing description, particularly to those familiar with and skilled in the art of treating and processing meats and meat products, that the described technique serves fully to attain an improved texture, tenderness, homogeneity, to present a marked improvement in standardization of meat products as to taste and appearance. It will further have become apparent that the meat products resulting from the process heretofore described, serve fully to attain all of the objects hereinabove expressed, as well as the many advantages implied from the more detailed description.

Although the invention has been described by making a somewhat particularized reference to preferred steps in the method and a preferred order of practice of same, the description is to be understood solely in an illustrative and not in a limiting sense, since many modifications may be made in various parts of the described method without departing from the full intended spirit and scope of the invention as defined by the claims hereunto appended.

We claim as our invention:

1. The described method of processing low-fiber, high-protein meats, which includes the steps of extracting the fresh meat for a protracted period with a saline solution, removing the extraction solution from the meat, freezing the meat to substantial solidity through its mass, thawing the mass to an extent to permit slicing, thereafter slicing the meat for dispensing, and in superposing the slices at a substantial angle to their original relative positions in the meat mass, and causing adherence of the slices in units for dispensing.

2. The herein described method of tenderizing and homogenizing fresh meats, which consists in confining the meat mass and subjecting it while confined, to a physical pressure of the order of 200 to 250 pounds per square inch, subjecting the meat while maintaining the pressure thereon, to temperatures or the order of plus 15° F. for a period of time of forty to fifty hours; restoring the temperature of the meat to a point slightly above freezing and while at the last said temperature slicing the meat; cross-piling the slices so that adjacent slices are at a substantial angle to their original relative positions in the meat mass, and subjecting the superposed slices to a moderate pressure sufficient to cause adherence of the slices, through the meat juices liberated by pressure and freezing, in laminated virtually homogenous units for dispensing to the trade.

3. The described method of treating fresh meats to increase their tenderness and homogeneity, which consists in confining the meat in a mold of a type to retain the meat juices, subjecting the meat while in the mold to a first step of shaping as determined by the form of mold, subjecting the meat in the mold to a determined physical pressure of an order of at least 150 lbs. per sq. inch, and sufficient to release in substantial part, the internal juices of the meat; hard-freezing the meat while in the mold and subjected to high physical pressure, thereafter thawing the meat just sufficient to permit slicing, without substantial loss of the meat juices, slicing the meat, cross-piling the slices for dispensing, and pressing together the piled slices under conditions to effect an adhesion thereof into a unitary mass, with the slices adhesively secured together by their own juices.

KARL G. PLITT, Sr.
KARL G. PLITT, Jr.
EUGENE A. PLITT.